United States Patent
Hsiao et al.

(10) Patent No.: US 9,426,908 B1
(45) Date of Patent: Aug. 23, 2016

(54) BOX STRUCTURE FOR DATA STORAGE DEVICE

(71) Applicant: SilverStone Technology Co., Ltd., New Taipei (TW)

(72) Inventors: Chun-Lan Hsiao, New Taipei (TW); Hsin-Hung Chen, New Taipei (TW); Chih-Chiang Chang, New Taipei (TW)

(73) Assignee: SILVERSTONE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/852,793

(22) Filed: Sep. 14, 2015

(51) Int. Cl.
*H05K 5/00* (2006.01)
*H05K 5/02* (2006.01)
*H05K 7/18* (2006.01)
*H05K 7/14* (2006.01)

(52) U.S. Cl.
CPC ............ *H05K 5/023* (2013.01); *H05K 5/0247* (2013.01); *H05K 7/1489* (2013.01); *H05K 7/183* (2013.01)

(58) Field of Classification Search
CPC .. H05K 5/023; H05K 5/0217; H05K 5/0221; H05K 7/1489; H05K 7/183; H05K 7/1409
See application file for complete search history.

(56) References Cited

U.S. PATENT DOCUMENTS

| | | | | | |
|---|---|---|---|---|---|
| 5,660,553 | A * | 8/1997 | Larabell | ............... | G11B 33/124 439/152 |
| 6,515,855 | B1 * | 2/2003 | Removedummy | ..... | G06F 1/184 361/609 |
| 8,616,662 | B2 * | 12/2013 | Yin | ....... | H05K 7/1489 312/223.2 |
| 8,641,313 | B1 * | 2/2014 | Crippen | ............... | H05K 5/0221 361/679.39 |
| 2009/0279249 | A1 * | 11/2009 | Crippen | .................. | G06F 1/187 361/679.58 |
| 2013/0092644 | A1 * | 4/2013 | Yin | ....... | H05K 7/1489 211/26 |
| 2013/0313955 | A1 * | 11/2013 | Kuo | ..... | G11B 33/124 312/326 |
| 2014/0117829 | A1 * | 5/2014 | Lin | ....... | G11B 33/124 312/350 |
| 2014/0204522 | A1 * | 7/2014 | Keffeler | ............... | G11B 33/128 361/679.31 |
| 2016/0050787 | A1 * | 2/2016 | Fu | ........ | H05K 7/1489 361/679.31 |

\* cited by examiner

*Primary Examiner* — Daniel Rohrhoff
(74) *Attorney, Agent, or Firm* — Chun-Ming Shih; HDLS IPR Services (57) ABSTRACT

A box structure for a data storage device is assembled in a chassis having a connector. The box structure includes a frame module, a holder, a stop assembly, and an operation handle. The frame module is provided for accommodating the data storage device. The holder is assembled on one side of the frame module. A damper is disposed between the holder and the frame module, the damper enables the holder to move along the frame module. A stop assembly is disposed at one end of the frame module. The stop assembly includes a stopper and a movable block in contact with the stopper, and the movable block is movable to release the stopper. The operation handle is pivotally connected to the frame module and is rotatable to form an open angle to push the movable block to move.

15 Claims, 11 Drawing Sheets

BOX STRUCTURE FOR DATA STORAGE DEVICE

TECHNICAL FIELD

The present invention relates to a box structure and, in particular, to a box structure having an operation handle enabling a two-step operation to allow a data storage device to be ejected slowly.

BACKGROUND

In order to facilitate replacing hard disks frequently for equipment such as a public computer, a replaceable hard disk box is commonly used in the market. By replacing different hard disks, data can be accessed, be kept confidential, be classified, etc. Furthermore, it is able to switch between different operating systems by changing the boot disk. Besides, in order to satisfy different demands, various creative designs are added to a conventional drawer-type replaceable hard disk box, including easy replacement, effective heat dissipation, a long life span, a burglar-proof lock, etc.

At present, there is provided a handle which can be operated to open the replaceable hard disk box. However, when the handle is opened, the hard disk is ejected quickly. Therefore, the hard disk tends to be damaged if the handle is opened due to inadvertent usage, shaking, or other reasons when the hard disk is still in use, accessing or storing data. Besides, it is not a friendly design to eject the hard disk by opening the handle at the same time when the hard disk is still performing operations, so improvement should be made in this regard.

Accordingly, it is desirable to overcome the problems resulted from the above-mentioned operation methods, on the basis of which the present invention is accomplished.

SUMMARY

It is an object of the present invention to provide a box structure having a two-step operation to protect a data storage device from damage.

It is another object of the present invention to provide a box structure by which a data storage device is released and ejected slowly only when an operation handle is rotated to open and form a certain open angle.

Accordingly, the present invention provides a box structure for a data storage device, for assembled in a chassis having a connector. The box structure includes a frame module, a holder, a stop assembly, and an operation handle. The frame module is provided to accommodate the data storage device. The holder is assembled on one side of the frame module. A damper is disposed between the holder and the frame module. The damper enables the holder to move along the frame module, and the data storage device is movable along with the holder. The stop assembly is disposed at one end of the frame module. The stop assembly includes a stopper and a movable block in contact with the stopper. The movable block is movable to release the stopper. The operation handle is pivotally connected to the frame module and is rotatable to form an open angle to push the movable block to move.

It is preferable that the holder includes two clamp plates, a press plate connected to the two clamp plates, and two first elastic elements. The press plate is movable along with the data storage device. The damper is disposed on one of the clamp plates. Each of the first elastic elements is connected to each of the clamp plates and the frame module for returning the holder to an initial position.

It is preferable that the frame module further includes two supporters opposite to each other, a pivot shaft, a pivot connection pillar disposed on one of the supporters, and a first bearing hole formed on the pivot connection pillar. The operation handle includes a bearing portion provided with a second bearing hole, and the pivot shaft passes through the first bearing hole and the second bearing hole to secure the operation handle to the supporter.

It is preferable that the stop assembly further includes an assembly plate, a second elastic element, and a third elastic element. The assembly plate is disposed on the supporter and limits movement of the stopper, two ends of the second elastic element are in contact with an inner surface of the stopper and the assembly plate respectively, and two ends of the third elastic elements are in contact with the movable block and the pivot connection pillar respectively.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
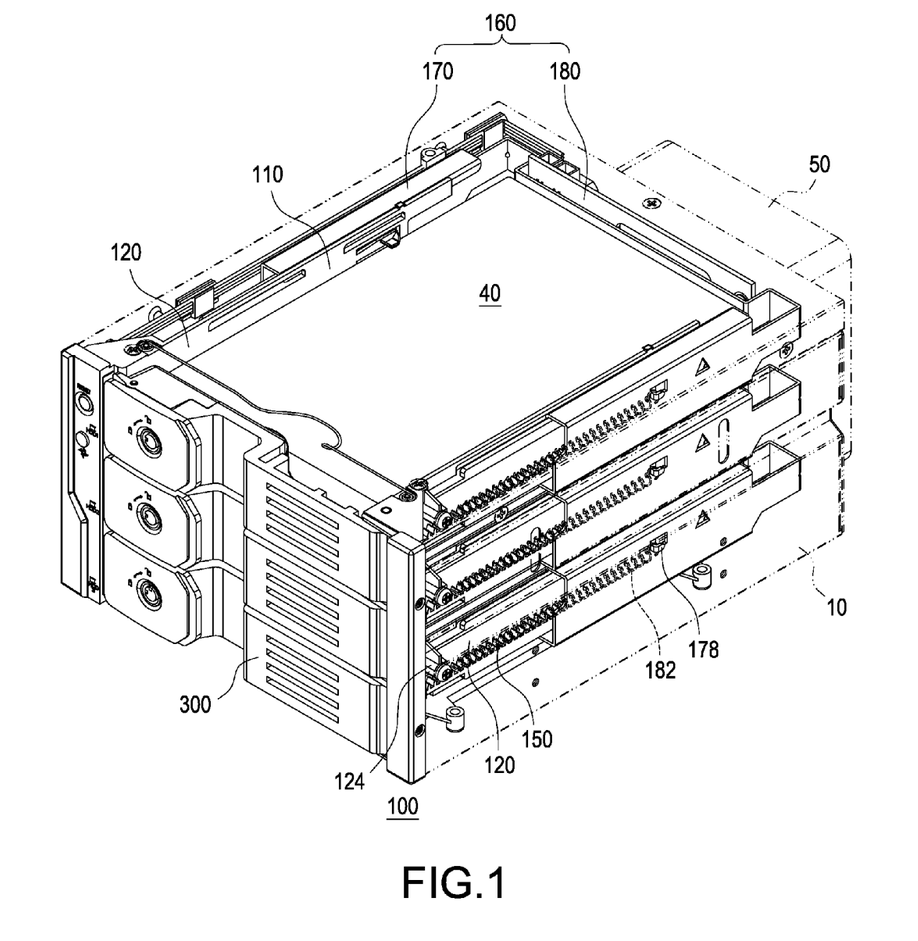
FIG. 1 is a perspective view of the present invention, showing a box structure for a data storage device.
Figure 2:
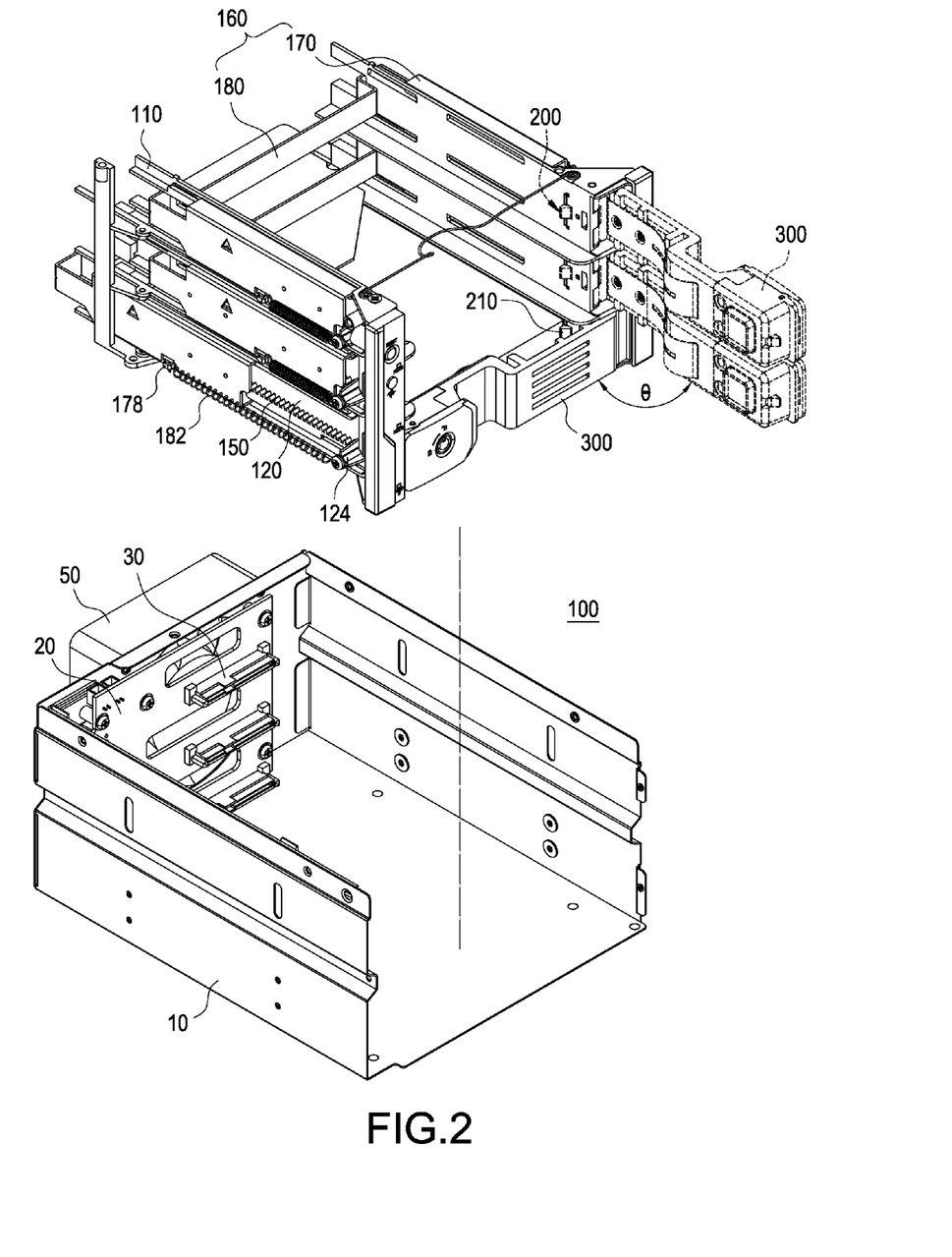
FIG. 2 is an exploded view of the present invention, showing the box structure for the data storage device.

Referring to FIGS. 1 and 2, the present invention provides a box structure 100 for a data storage device. The box structure 100 is assembled in a chassis 10 having a connector 30. According to the embodiment shown in FIG. 2, it is preferable that the connector 30 is electrically connected to a circuit board 20, and a fan 50 is disposed at one side of the chassis 10 corresponding to the connector 30 to dissipate heat of the data storage device 40. The data storage device 40 includes, but is not limited to, a hard disk or other suitable hot-swapping electronic devices, and the data storage device 40 of the present invention is not intended to be limited to any particular size and type. In the box structure 100 according to the present exemplary embodiment, three data storage devices 40 are separately received; however, in other different embodiments, there could be only one data storage device 40 received by using only one frame module 110, only one holder 160, etc. Therefore, for ease of illustration, the box structure 100 is described hereinafter with respect to only one data storage device 40.

Figure 3:
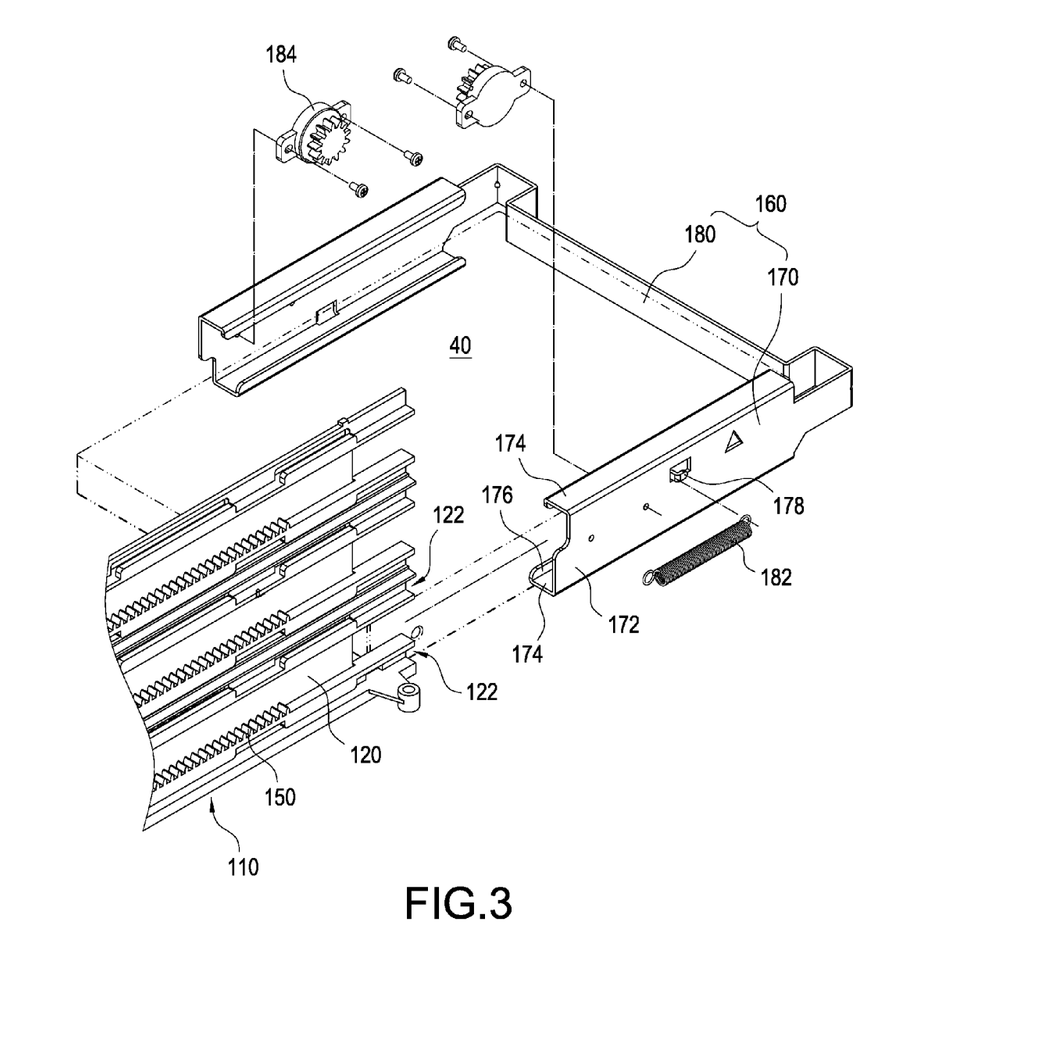
FIG. 3 is an exploded view of the present invention, showing a holder and a frame module (i.e. a supporter)
Figure 4:
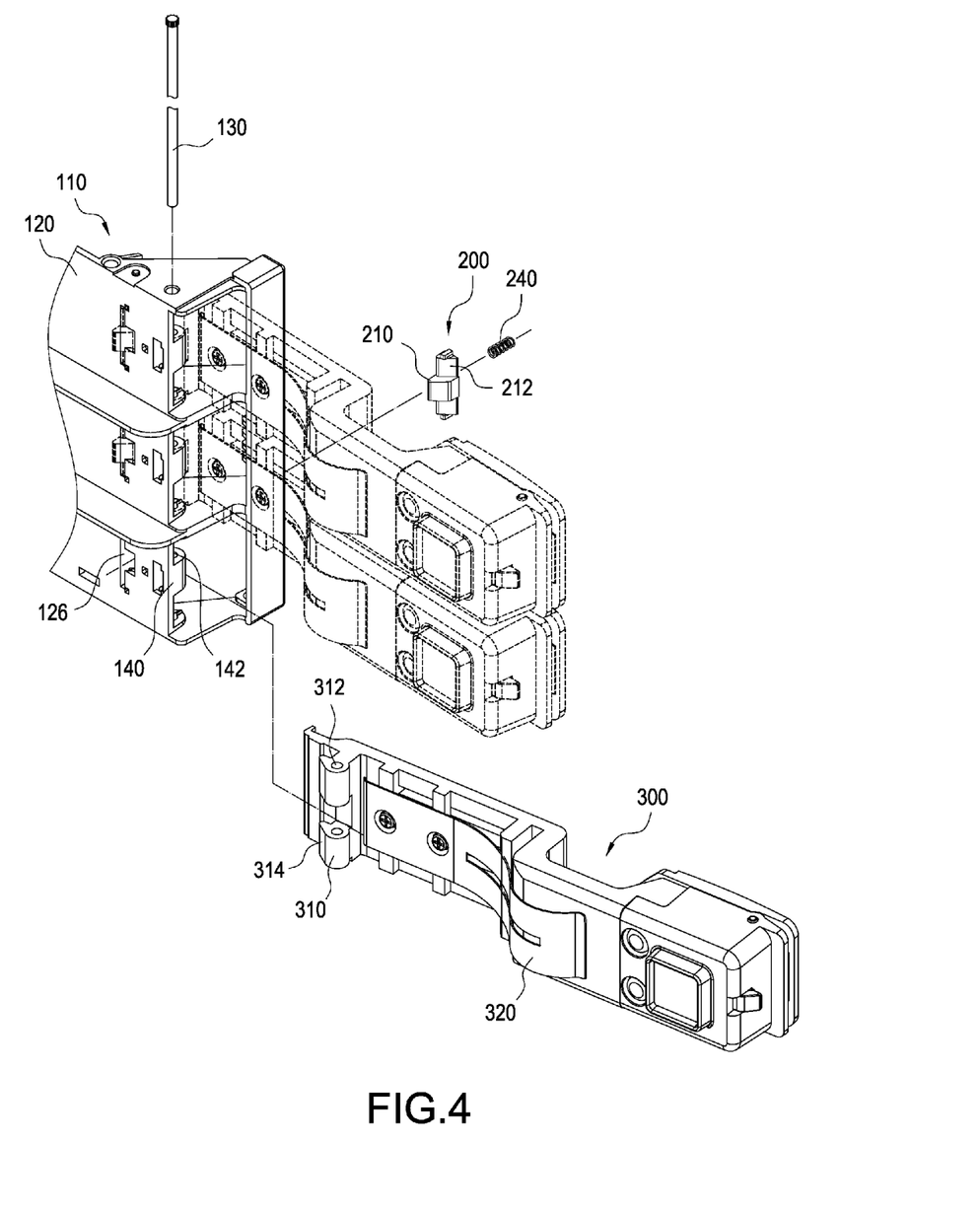
FIG. 4 is an exploded view of the present invention, showing an operation handle and the frame module (i.e. the supporter)
Figure 5:
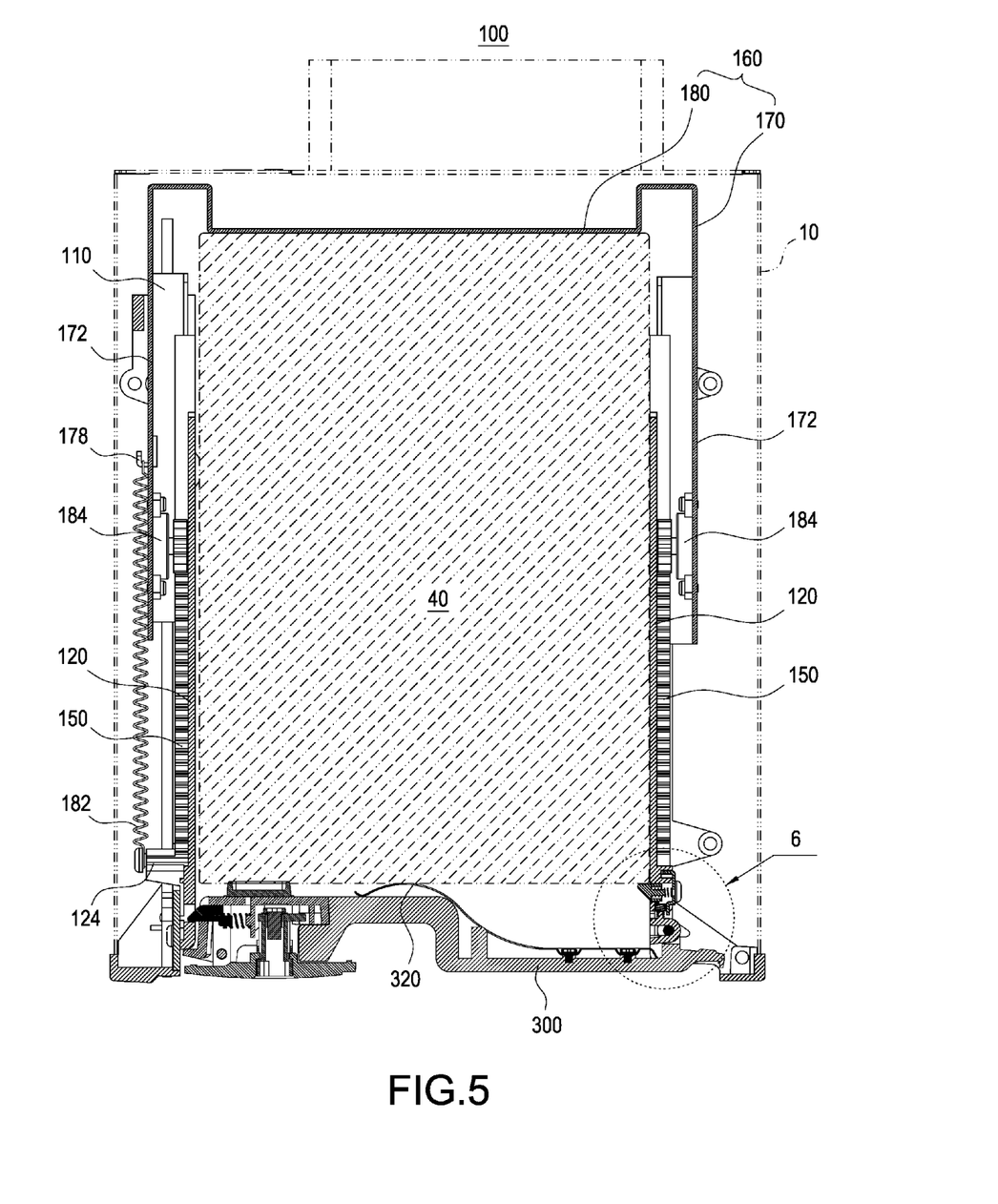
FIG. 5 is a cross-sectional view of the present invention, showing the box structure for the data storage device.

Referring to FIGS. 3 and 4, the box structure 10 includes a frame module 110, a holder 160, a stop assembly 200, and an operation handle 300. The frame module 110 is provided to accommodate the data storage device 40. A holder 160 preferably made of plastic is assembled on one side of the frame module 110, wherein a damper 184 is disposed between the holder 160 and the frame module 110, the damper 184 enables the holder 160 to move along the frame module 110, and the data storage device 40 is movable along with the holder 160. In other words, the holder 160 moves backward as the data storage device 40 is installed, and the holder 160 moves forward as the data storage device 40 is ejected.

The stop assembly 200 is disposed at one end of the frame module 110, the stop assembly 200 includes a stopper 210 and a movable block 220 in contact with the stopper 210, and the movable block 220 is movable to release the stopper 210. The operation handle 300 is rotatable and pivotally connected to the frame module 110, the operation handle 300 includes a protruding portion 314 for pushing the movable block 220, and the operation handle 300 is operable to form an open angle θ. The holder 160 further includes two clamp plates 170, a press plate 180 connected to the two clamp plates 170, and two first elastic elements 182, the press plate 180 is movable along with the data storage device 40. Each of the first elastic elements 182 is connected to each of the clamp plates 170 and the frame module 110 for returning the holder 160 to an initial position.

Referring to FIGS. 2 and 3, each of the clamp plates 170 further includes a flat plate 172 and a side plate 174 connected to two ends of the flat plate 172, the frame module 110 includes two opposite supporters 120, each of the side plates 174 is slidably connected to both ends of the supporter 120. In detail, each of the side plates 174 further includes a bend portion 176, and the supporter 120 includes a guiding slot 122 corresponding to the bend portion 176, so that the clamp plate 170 is slidably engaged with the supporter 120. In the embodiment shown in FIG. 3, the damper 184 is preferably disposed on one of the clamp plates 170. However, in other different embodiments, the damper 184 can also be disposed on the supporter 120 of the corresponding frame module 110.

In the present embodiment, the first elastic element 182 is preferably an extension spring, and two ends thereof are secured to a hook portion 178 of the flat plate 172 and a column 124 of the supporter 120, respectively. When the data storage device 40 is installed in the frame module 110 and pushes the press plate 180 of the holder 160 to move, the first elastic element 182 is extended, and the data storage device 40 is restricted by the stopper 210 and the operation handle 300 from movement. On the contrary, when the operation handle 300 forms the open angle θ to release the stopper 210, the press plate 180 of the holder 160 pushes the data storage device 40 to move out of the frame module 110.

At this point, the first elastic element 182 returns to a compressed state, and therefore a distance between the holder 160 and the supporter 120 is shortened.

The open angle θ is preferably greater than 90 degrees; however, in other different embodiments, the open angle θ can be less than or equal to 90 degrees, and the open angle θ is not intended to be limited by the present invention. No matter what angle the open angle θ is, the data storage device 40 is ejected by a two-step operation. That is to say, the open angle θ has to be formed first to push and release the stopper 210, and then the data storage device 40 can be ejected slowly upon the action of the damper 184. Therefore, when the operation handle 300 forms the open angle θ, the data storage device 40 is not ejected directly and quickly as by conventional techniques, thereby preventing damage to the data storage device 40 caused by ejecting the data storage device 40 while it is still in use. In other words, the present invention can prolong a life span of the data storage device 40.

Referring to FIG. 4, an open slot 126 is formed on a side wall of the supporter 120, and one end of the stopper 210 movably protrudes out of the open slot 126. Furthermore, the operation handle 300 further includes an elastic plate 320 provided to stably keep the data storage device 40 electrically connected to the connector 30. In the present embodiment, a transmission portion 150 is disposed corresponding to the damper 184. That is to say, when the transmission portion 150 is disposed on an outer side wall of the supporter 120, the damper 184 is disposed on the flat plate 172 of the clamp plate 170. As shown in FIG. 3, the transmission portion 150 is preferably a rack, and the damper 184 is a damping gear. In other embodiments, the transmission portion 150 can also be rubber, gum, or other suitable material providing high friction.

When the damping gear is engaged with the rack, the damping gear provides a damping force, such as flow resistance and friction, so that the damping gear moves slowly on the rack. Therefore, when ejecting the data storage device 40, the data storage device 40 is slowly ejected out of the chassis 10 upon the action of the damper 184. Accordingly, the present invention provides protection to the data storage device 40 and allows a user to visually feel the operation.

Referring to FIGS. 5 to 10, the frame module 110 further includes a pivot shaft 130, a pivot connection pillar 140 disposed on one of the supporters 120, and a first bearing hole 142 formed on the pivot connection pillar 140. The operation handle 300 includes a bearing portion 310 provided with a second bearing hole 312, and the pivot shaft 130 passes through the first bearing hole 142 and the second bearing hole 312 to secure the operation handle 300 to the supporter 120.

Figure 6:
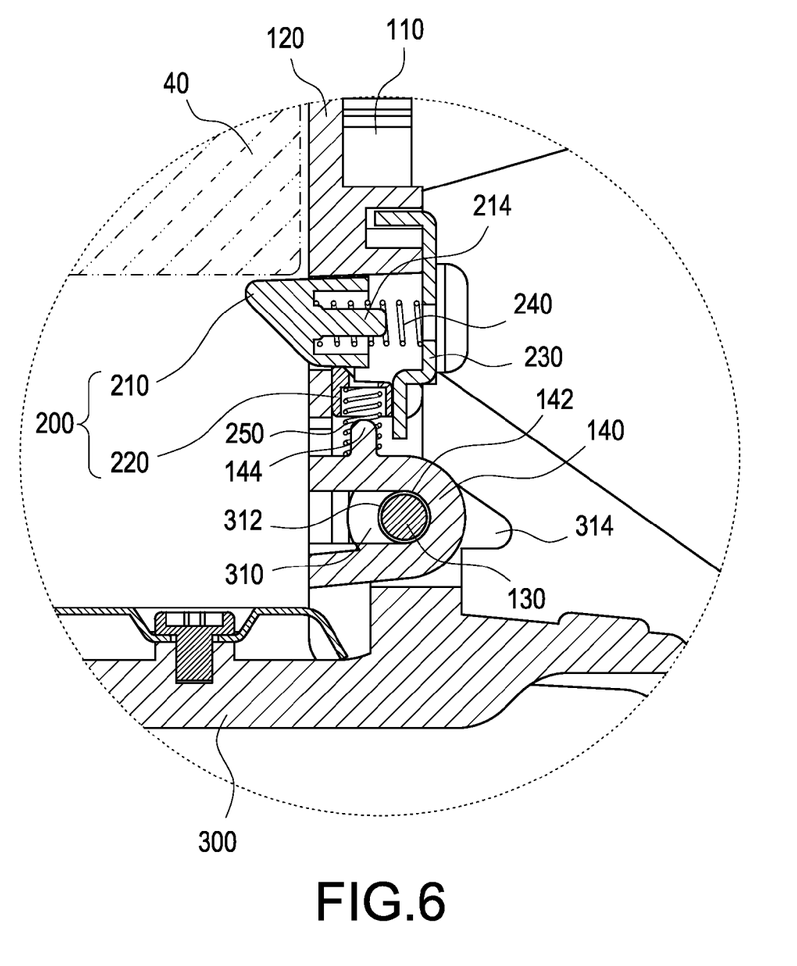
FIG. 6 is a partial enlarged view of FIG. 5.
Figure 9:
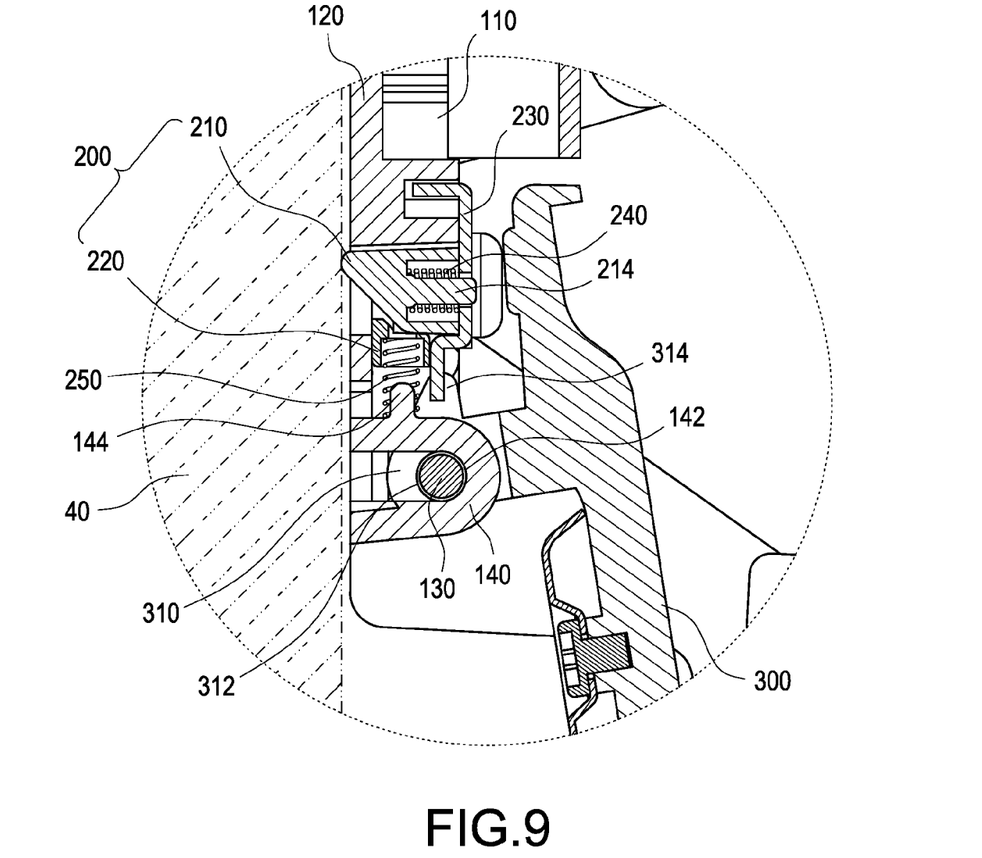
FIG. 9 is a partial enlarged view of FIG. 8.

Referring to FIGS. 6 and 9, the stop assembly 200 further includes an assembly plate 230, a second elastic element 240, and a third elastic element 250. The assembly plate 230 is disposed on the supporter 120 and limits movement of the stopper 210, two ends of the second elastic element 240 are in contact with an inner surface of the stopper 210 and a side surface of the assembly plate 230 respectively, and two ends of the third elastic elements 250 are in contact with the movable block 220 and the pivot connection pillar 140 respectively. The stopper 210 further includes a first positioning portion 214 therein, a second positioning portion 144 protruding toward the movable block 220 is disposed on one side of the pivot connection pillar 140, one end of the second elastic element 240 is positioned on and in contact with the first positioning portion 214, and the other end of the second elastic element 240 is in contact with the side surface of the assembly plate 230. One end of the third elastic element 250 is positioned on and in contact with the second positioning portion 144, and the other end of the third elastic element 250 is in contact with an inner surface of the movable block 220. In the present embodiment, there are preferably two second elastic elements 240 and two third elastic elements 250 to restore the stopper 210 or the movable block 220 more stably.

Figure 7A:
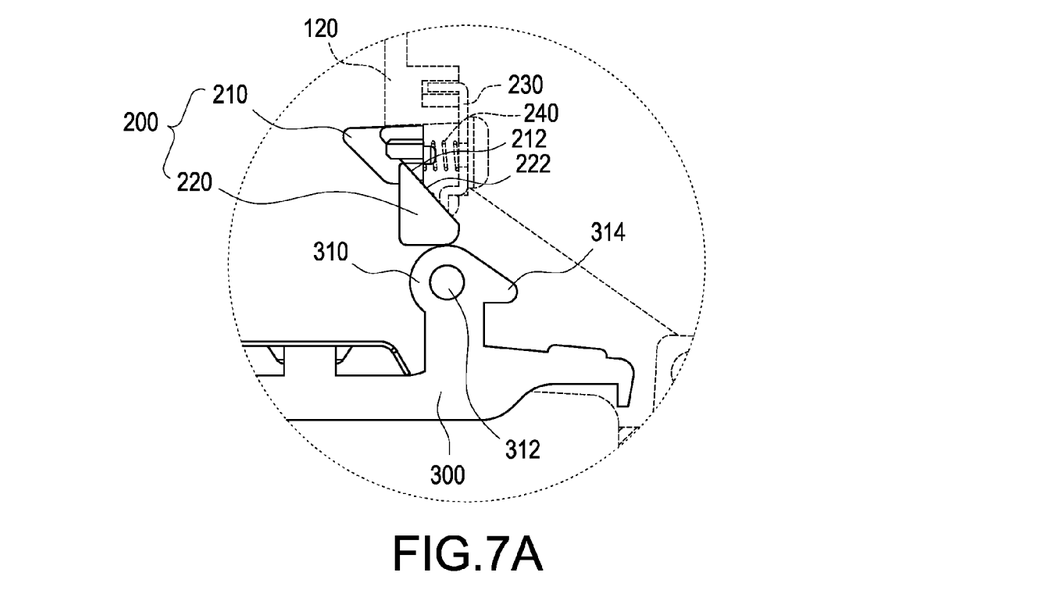
FIG. 7A is a partial top view of the present invention, showing an operation handle and a stop assembly.
Figure 7B:
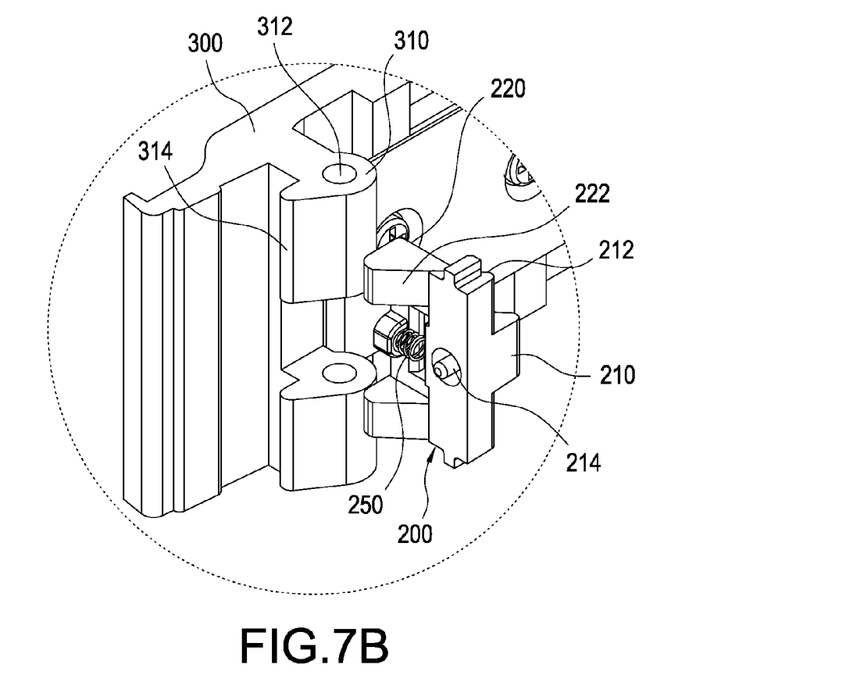
FIG. 7B is a partial enlarged view of the present invention, showing the operation handle and the stop assembly.
Figure 8:
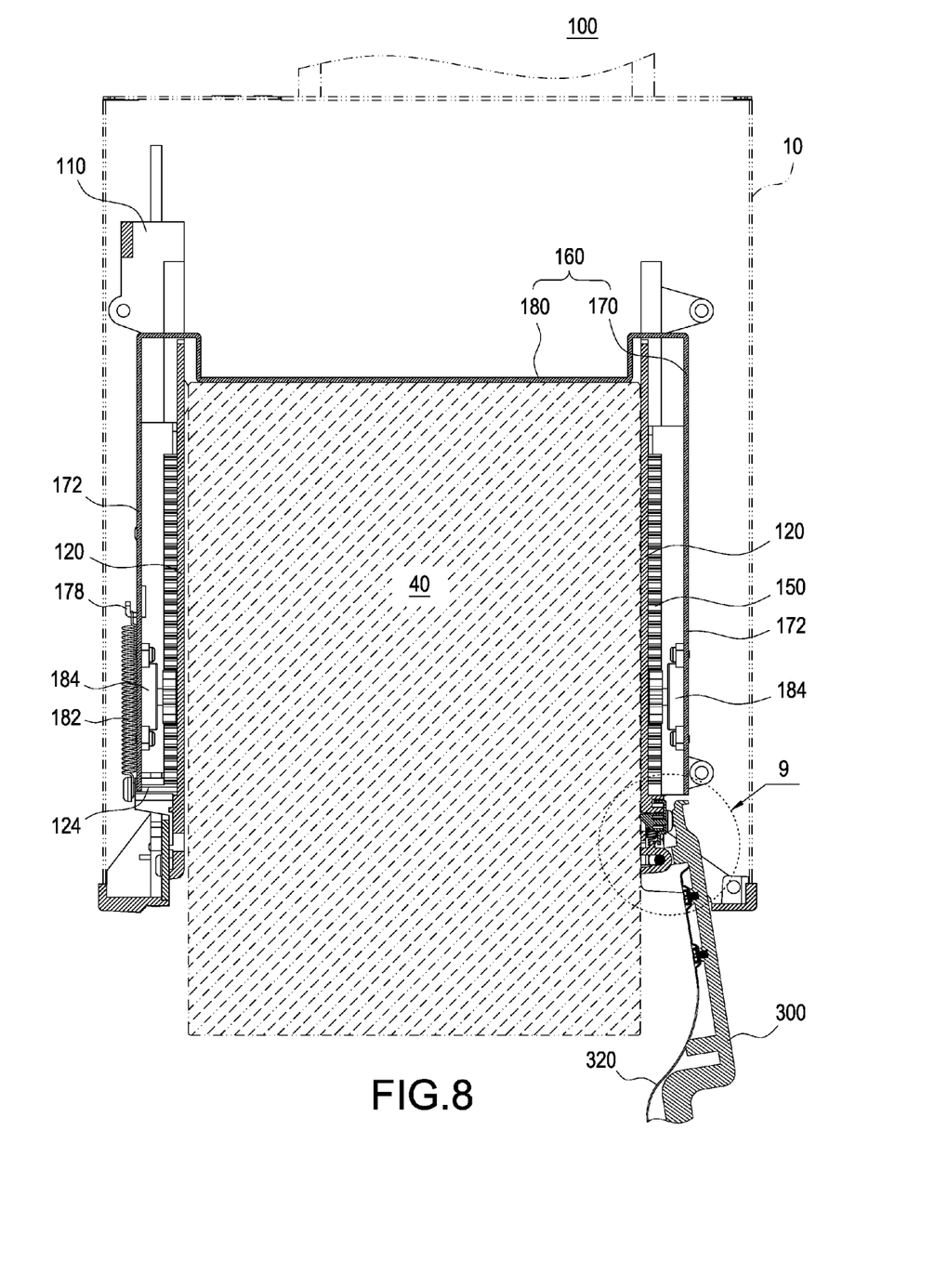
FIG. 8 is a cross-sectional view of the present invention, showing the stop assembly releasing the data storage device.
Figure 10A:
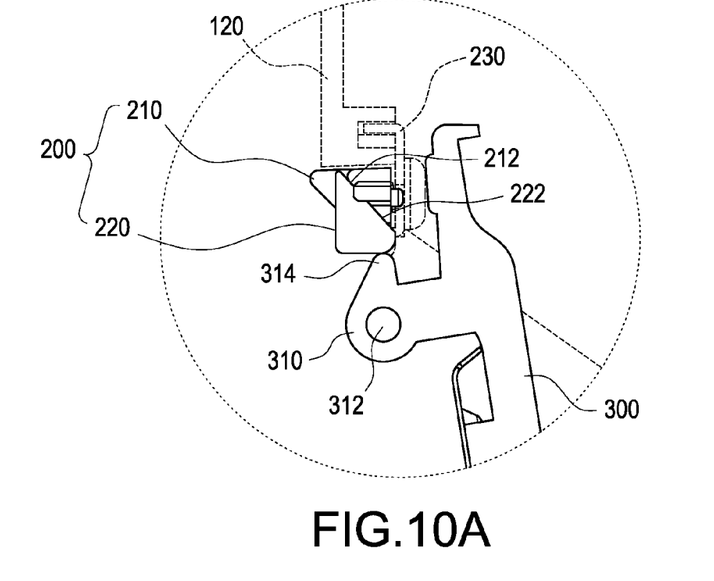
FIG. 10A is a partial top view of the present invention, showing the operation handle forming an open angle to enable a movable block to push a stopper.
Figure 10B:
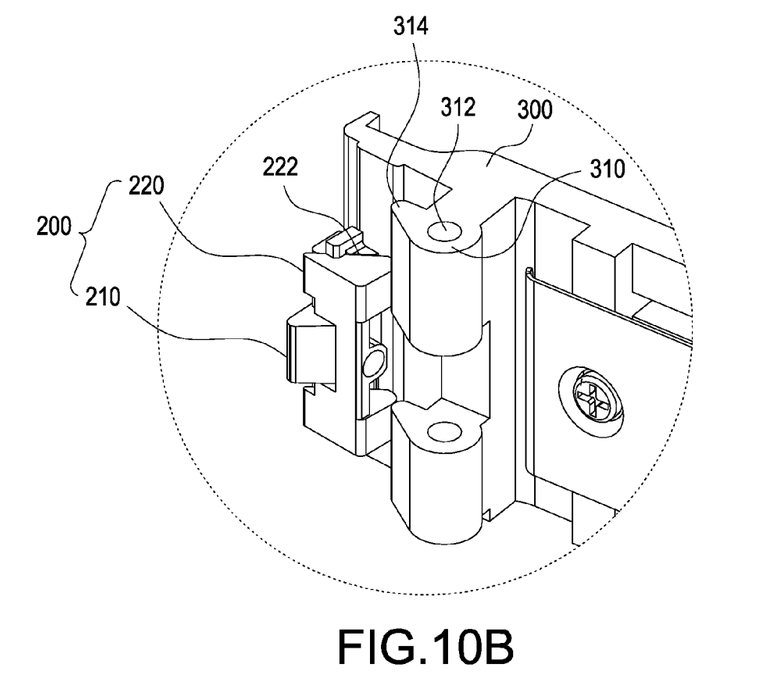
FIG. 10B is a partial perspective view of the present invention, showing the operation handle forming the open angle to enable the movable block to push the stopper.

In the embodiment shown in FIGS. 7B and 10B, the stopper 210 further includes a first inclined surface 212, and the movable block 220 includes a second inclined surface 222 in contact with the first inclined surface 212. When the operation handle 300 is opened to form the open angle θ, the protruding portion 314 pushes the movable block 220. The movable block 220 (i.e. the second inclined surface 222) pushes the stopper 210 (i.e. the first inclined surface 212), the stopper 210 is moved (toward the assembly plate 230) by the relative movement between the first inclined surface 212 and the second inclined surface 222 to release the data storage device 40. That is to say, as shown in FIGS. 8 to 10B, the second elastic element 240 in the stopper 210 is compressed, and the stopper 210 moves toward the assembly plate 230 until the data storage device 40 is released.

Referring to FIGS. 5 to 7B, when the operation handle 300 is returned (e.g., receiving the data storage device 40), the protruding portion 314 leaves the movable block 220. Since the elasticity of the second elastic element 240 is greater than that of the third elastic element 250, the second elastic element 240 of the stopper 210 rebounds to restore the stopper 210 to a state of confining the data storage device 40 and pushes the movable block 220 to return to an initial position. In other words, when the first inclined surface 212 of the stopper 210 pushes the second inclined surface 222 of the movable block 220, the stopper 210 and the movable block 220 are restored to respective initial positions, so that the stopper 210 limits the movement of the data storage device 40.

Figure 11:
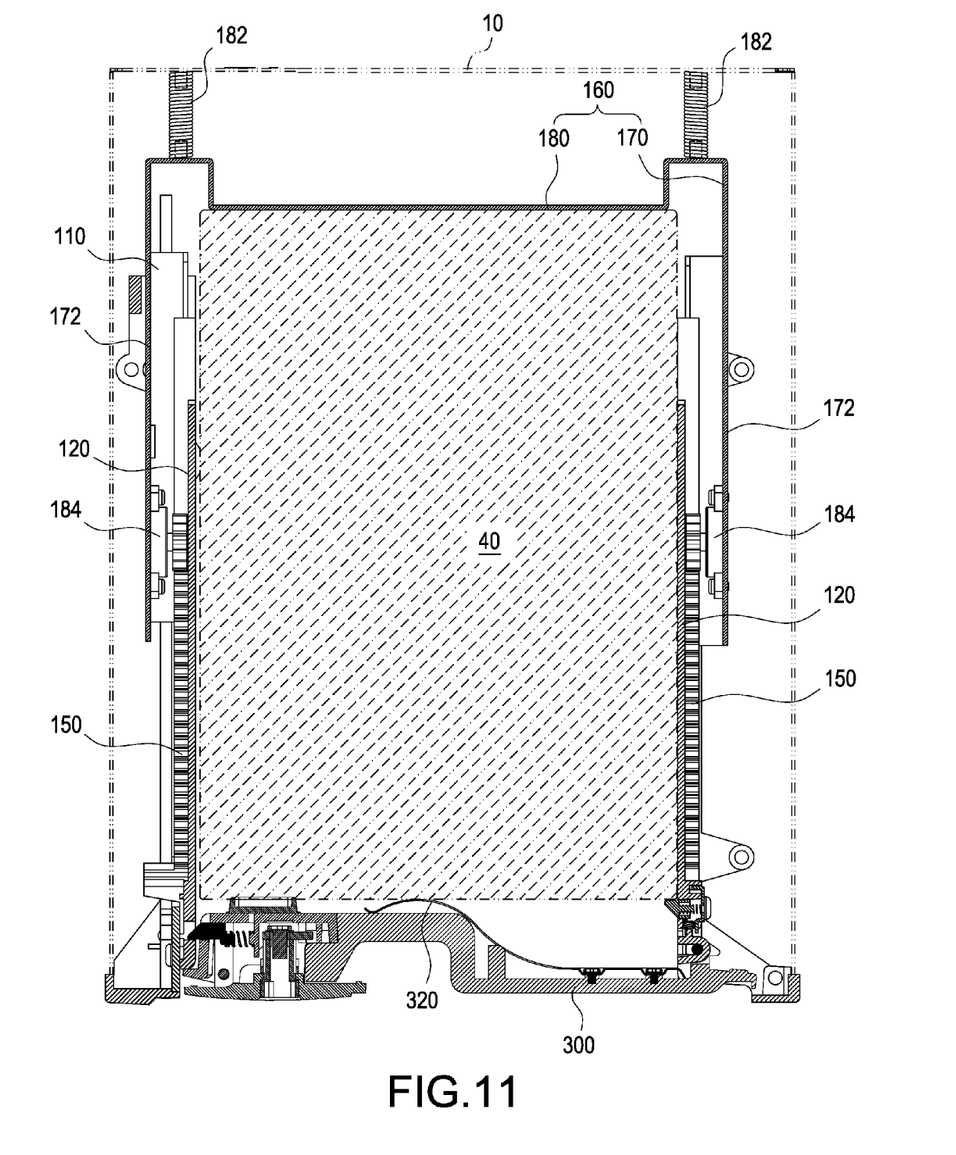
FIG. 11 is a cross-sectional view showing another preferable embodiment of the present invention.

FIG. 11 is a cross-sectional view showing another preferable embodiment of the present invention. In this embodiment, the first elastic element 182 can also be a compression spring with one end connected to the press plate 180 and the other end fastened to the chassis 10, and the first elastic element 182 is used to push the holder 170 to eject the data storage device 40 out of the chassis 10. The operating principles and components of the present embodiment are the same as those of the above-mentioned embodiment, so their descriptions are omitted herein.

It should be noted that the elasticity of the first elastic element 182 has to be greater than the damping force of the damper 184 in order to push the data storage device 40 out of the chassis 10. In addition to that, the present invention utilizes the cooperation between the damper 184 and the transmission portion 150 to slowly eject the data storage device 40.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A box structure for a data storage device, assembled in a chassis including a connector, comprising:
    a frame module for accommodating the data storage device;
    a holder assembled on one side of the frame module, wherein a damper is disposed between the holder and the frame module, the damper enables the holder to move along the frame module, and the data storage device is movable along with the holder;
    a stop assembly disposed at one end of the frame module, the stop assembly including a stopper and a movable block in contact with the stopper, the movable block being movable to release the stopper; and
    an operation handle pivotally connected to the frame module, the operation handle being rotatable to form an open angle to push the movable block.

2. The box structure of claim 1, wherein the holder further includes two clamp plates, a press plate connected to the two clamp plates, and two first elastic elements, the press plate is movable along with the data storage device, the damper is disposed on one of the clamp plates, each of the first elastic elements is connected to each of the clamp plates and the frame module for returning the holder to an initial position thereof.

3. The box structure of claim 2, wherein each of the clamp plates further includes a flat plate and a side plate connected to two ends of the flat plate, the frame module includes two opposite supporters, and each of the side plates is slidably connected to both ends of each of the supporters.

4. The box structure of claim 3, wherein each of the side plates further includes a bend portion, and the supporter includes a guiding slot corresponding to the bend portion, so that the clamp plate is slidably engaged with the supporter.

5. The box structure of claim 3, wherein each of the first elastic elements is an extension spring, and a transmission portion is disposed on the supporter.

6. The box structure of claim 2, wherein each of the first elastic elements is a compression spring with one end connected to the press plate and the other end fastened to the chassis.

7. The box structure of claim 1, wherein the frame module further includes two supporters opposite to each other, a pivot shaft, a pivot connection pillar disposed on one of the supporters, and a first bearing hole formed on the pivot connection pillar, the operation handle includes a bearing portion provided with a second bearing hole, and the pivot shaft passes through the first bearing hole and the second bearing hole to secure the operation handle to the supporter.

8. The box structure of claim 7, wherein the stop assembly further includes an assembly plate, a second elastic element, and a third elastic element, the assembly plate is disposed on the supporter and limits movement of the stopper, two ends of the second elastic element are in contact with an inner surface of the stopper and the assembly plate respectively, and two ends of the third elastic elements are in contact with the movable block and the pivot connection pillar respectively.

9. The box structure of claim 8, wherein the stopper further includes a first positioning portion therein, a second positioning portion protruding toward the movable block is disposed on one side of the pivot connection pillar, the second elastic element is positioned on the first positioning portion, and the third elastic element is positioned on the second positioning portion.

10. The box structure of claim 8, wherein the second elastic element and the third elastic element are each a compression spring for returning the stopper and the movable block to respective initial positions.

11. The box structure of claim 7, wherein an open slot is formed on a side wall of the supporter, and one end of the stopper movably protrudes out of the open slot.

12. The box structure of claim 1, wherein the operation handle includes a protruding portion for pushing the movable block, the stopper further includes a first inclined surface, and the movable block includes a second inclined surface in contact with the first inclined surface.

13. The box structure of claim 12, wherein when the operation handle is opened to form the open angle, the protruding portion pushes the movable block, and the stopper is moved by the relative movement between the first inclined surface and the second inclined surface to release the data storage device.

14. The box structure of claim 1, wherein the transmission portion is a rack, and the damper is a damping gear.

15. The box structure of claim 1, wherein the open angle is less than, equal to, or greater than 90 degrees.

* * * * *